United States Patent
Furr et al.

(10) Patent No.: US 10,003,660 B2
(45) Date of Patent: Jun. 19, 2018

(54) SYSTEM AND METHOD FOR DATA PLANE SIGNALED PACKET CAPTURE IN A SERVICE FUNCTION CHAINING NETWORK

(71) Applicant: Cisco Technology, Inc., San Jose, CA (US)

(72) Inventors: Richard Furr, Fredericksburg, VA (US); Nagendra Kumar Nainar, Morrisville, NC (US); Carlos Pignataro, Raleigh, NC (US); Joseph Michael Clarke, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 159 days.

(21) Appl. No.: 15/056,516

(22) Filed: Feb. 29, 2016

(65) Prior Publication Data

US 2017/0251065 A1    Aug. 31, 2017

(51) Int. Cl.
*H04L 12/26*    (2006.01)
*H04L 29/08*    (2006.01)
(Continued)

(52) U.S. Cl.
CPC ............ *H04L 67/16* (2013.01); *H04L 45/566* (2013.01); *H04L 45/64* (2013.01); *H04L 45/74* (2013.01)

(58) Field of Classification Search
CPC ...................................................... H04L 43/00
See application file for complete search history.

(56) References Cited

U.S. PATENT DOCUMENTS 7,626,938 B1 *  12/2009  Orr ..................... H04L 12/4625
                                              370/251
2011/0080835 A1 *  4/2011  Malomsoky .......... H04L 43/026
                                              370/241

(Continued)

FOREIGN PATENT DOCUMENTS

WO       2015165212 A1    11/2015

OTHER PUBLICATIONS

Raza Cisco Systems K et al: "IPv6 Router Alert Option for MPLS Operations, Administration, and Maintenance (OAM); rfc7506.txt", Internet Engineering Task Force; Standard Internet Society 4, Apr. 17, 2015, pp. 1-6, XP015104594.

(Continued)

*Primary Examiner* — Kevin C Harper
(74) *Attorney, Agent, or Firm* — Meunier Carlin & Curfman LLC

(57) ABSTRACT

Presented herein are service-function chaining techniques that enable data plane signaling of a packet as a candidate for capture at various network nodes along a service function path of a service function chain. That is, a capture signal is embedded within the respective packet that carries a user traffic. The signaling occurs in-band, via the data plane, such that classification of the packet for capture beneficially occurs, at the ingress node of the network, once to which subsequent network nodes along a service function path are signaled to capture or further inspect the packet for capture. Service function chaining treats service functions as resources with associated attributes available for scheduled consumption to which selective traffic are steered according to a policy construct to the requisite network-service resources.

19 Claims, 11 Drawing Sheets

(51) Int. Cl.
*H04L 12/741* (2013.01)
*H04L 12/721* (2013.01)
*H04L 12/715* (2013.01)

(56) References Cited

U.S. PATENT DOCUMENTS

2014/0177428 A1 6/2014 Sinha
2017/0155592 A1 6/2017 Chen

OTHER PUBLICATIONS

International Search Report and Written Opinion of the International Searching Authority from Application No. PCT/US2017/019857, dated Jun. 27, 2017, 15 pages.

* cited by examiner

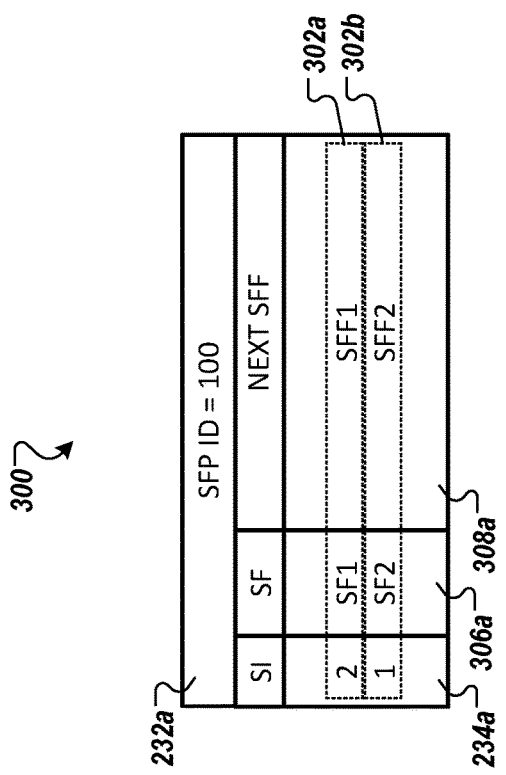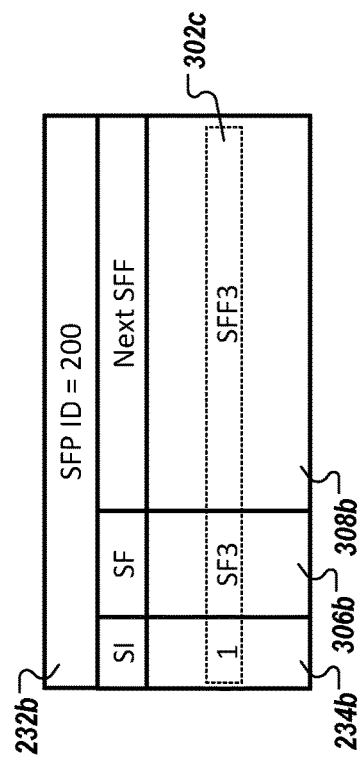
FIG. 3A
FIG. 3B

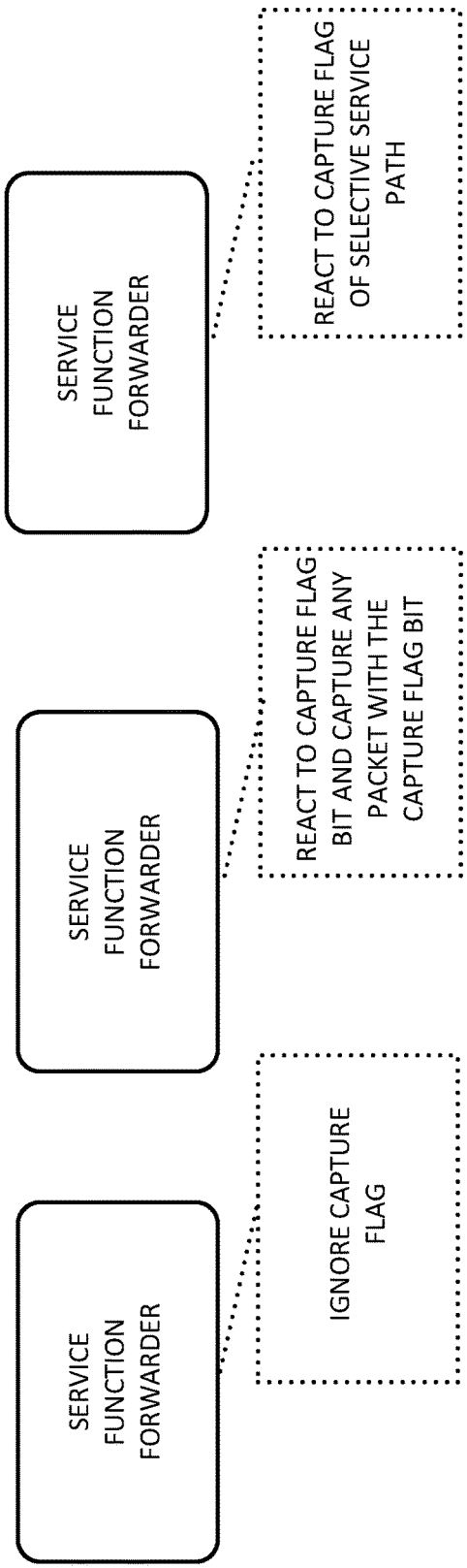

US 10,003,660 B2

SYSTEM AND METHOD FOR DATA PLANE SIGNALED PACKET CAPTURE IN A SERVICE FUNCTION CHAINING NETWORK

TECHNICAL FIELD

The present disclosure relates to networking of service function chains.

BACKGROUND

Service function chains (also referred to as service chains) define a set of service functions (e.g., network address translation (NAT), intrusion prevention, intrusion detection, deep packet inspection (DPI), firewall, switching, load-balancing, and network acceleration functions, among others), and their order (e.g., in a list such as service1->service 2) to be applied to selective packets as they are forwarded through network devices to create a composite of network service (e.g., L4-L7 services). The order in which each individual service is applied is predetermined through an orchestration function and that order is mapped into each network node that is involved in the forwarding of packets through a given service function chain. The mapping of forwarded state within the service chain structure is referred to as a service path.

In certain circumstances, packets in a traffic flow may be captured by network administrators for analysis—such as to identify applications operating on a given network; identify points of intrusions to identify security flaws and breaches; identify data leakages; troubleshoot occurrences of undesired network events; identify and/or recover lost or stolen data and packets; determine extent of network elements comprised by virus and malware; assess impact of changes within a network; and ensure long-term compliance issues.

BRIEF DESCRIPTION OF THE DRAWINGS

FIGS. 3A and 3B each illustrates an example service function table defining a service function path in accordance with an illustrative embodiment.

FIGS. 8, 9, 10, and 11, are diagrams illustrating SFF policies in response to a positive packet capture signal in accordance with various illustrative embodiments.

FIGS. 12-14, comprising FIGS. 12, 13, and 14, are diagrams illustrating SFF policies in a service chain network in accordance with an illustrative embodiment.

DESCRIPTION OF EXAMPLE EMBODIMENTS

Overview

Figure 1:
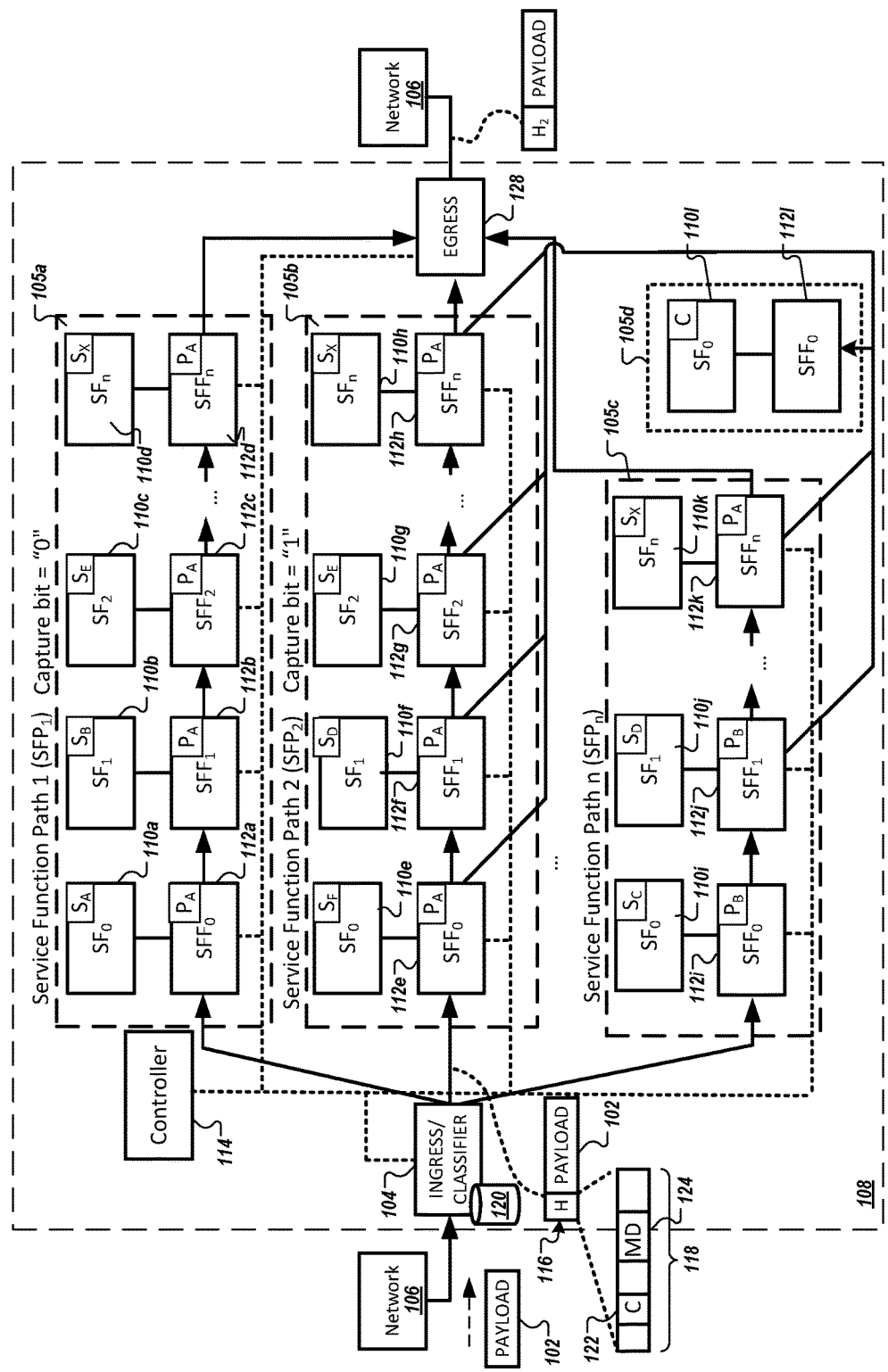
FIG. 1 is a diagram illustrating an example service function chain in which a packet is signaled as a candidate for capture at one or more service functions within the service chain in accordance with an illustrative embodiment.

Presented herein are service-function chaining techniques that enable data plane signaling of a packet as a candidate for capture at various network nodes along a service function path of a service function chain. That is, a capture signal is embedded within the respective packet that carries a user traffic. The signaling occurs in-band, via the data plane, such that classification of the packet for capture beneficially occurs once, at the ingress node of the network, to which subsequent network nodes along a service function path are signaled to capture or further inspect the packet for capture.

Service function chaining treats service functions as resources with associated attributes available for scheduled consumption to which selective traffic are steered according to a policy construct to the requisite network-service resources.

Example Embodiments

As a part of traffic analysis, monitoring, and troubleshooting of a network, a network administrator or operator may have a need or desire to capture packet flow within a service chain. While control and data-plane elements are well understood, it is not currently possible to have full visibility of a packet at multiple points within service chain without deploying, at each of the points, a packet sniffer and protocol analyzer synchronized to one another or defining a complex filters to determine a packet for capture. In addition, though packet capture services may be defined as a service function in a service function path, such static service functions are cumbersome to define and use.

The disclosed technology enables the data plane signaling of a service header packet as a candidate for capture. The service header packet uses a capture flag bit that allows the packet itself to signal "capture me". Such signaling alleviates complexities associated with the configuration and synchronization at different capturing points in a very scalable manner that further does not require filters specific to an application, device, or packet to be defined. The signaling further provides for granular signaling and capture (e.g., specific to flow path, service path, time, and count) of the packet that may be defined in a dynamic manner.

According to an aspect, in a network comprising a plurality of network nodes each configured to apply at least one service function to traffic that passes through the respective network node (e.g., a service function chain network), a method is provided to receive, for example, at a first network node (e.g., a classifier at an ingress of the service function chain) at an ingress port of the service chain, a packet to selectively apply, according to one or more policies enforced at the first network node, one or more service functions, which are applied along one or more service functions paths defined by the plurality of network nodes. The method further includes receiving, at the first network node, one or more packet capture policies. The packet capture policies may be selected from the group consisting of per-SFP capture, per-flow in the SFP capture, time capture, and packet count capture. The method further includes, for each of the more service function paths selected to be traversed by the received packet, generating, at the first network node, a service function packet having a service function header that encapsulates the received packet. The service function header includes a capture bit, in a data-plane portion of the service function header, that signals, to the plurality of network nodes along each selected service path, the packet as a candidate for capture. Subsequently, each generated service function packet is transmitted to a plurality of service function forwarders associated with the selected service function path, where each service function forwarder is traversed according to an order defining the selected service function path. At each service function forwarder, the received service function packet is forwarded to a corresponding network node associated with the given service function forwarder to apply a service function, then the packet is forwarded to a next service function forwarder. In addition, in some embodiments, each service function forwarder is configured to interrogate the capture bit and initiate, upon a presence of a positive capture signal, and capture the encapsulated packet of the service function packet.

The service function header, in some embodiments, includes a base header of a Network Service Header (NSH). In some embodiments, the capture bit includes at least one bit selected from the group consisting of bit 4, bit 5, bit 6, bit 7, bit 8, and bit 9, of the base header of the Network Service Header. Details of the Network Service Header is found at the Internet Draft of the Network Service Header published by the International Engineering Task Force (IETF) Service Function Chaining Working Group.

The introduction of the capture signal at the classifier, ingress to the service chain, enables the systematic synchronization of capture at any node and/or service function in the service chain. The service function forwarder may be configured, during its instantiation, with one or several available policy to react to the capture signal. This finite number of capture policy at the service function forwarder allows for scalability of the packet capture on a per service-function-path basis and a per service-function-chain basis.

The capture at nodes and/or service function along the service function path further provide granularity to the capture of the packet that lends to capture policy such as on a per service-function-path basis, per-flow within a service-function-path basis, as well as by time and packet count.

In some embodiments, the capture signal is further introduced by network nodes, such as service function forwarder and/or service functions downstream to the ingress within a service path to enable inter element signaling within the service function path. Downstream elements may employ capture policies already established during their instantiations.

In certain embodiments, the service chain implements a rapid forwarding semantics at each service function forwarder in which, upon detecting presence of a positive capture signal at the capture bit, the service function forwarder replicates a second service function packet and forwards the second replicated service function packet to a service function path having a packet capture service function (e.g., a packet storage service function) or a deep packet inspection service function (e.g., a packet storage and analysis service function). In some embodiments, each of the packet capture service or deep packet inspection service function is service-network wide in that, the packet capture service/deep packet inspection service solely receives all traffic designated as a candidate for capture from the other service function paths. A conventional service function forwarder replicates and forwards each received service function packet to a corresponding network service linked to the service function forwarder and then forwards the packet to a next service function forwarder along the service function path.

In some embodiments, the service function packet generated at the first network node includes a metadata header portion that includes information relating to the capture of the packet. In some embodiments, the metadata header portion includes a first field specifying a format or policy for the packet to be captured at each respective network node. The metadata header portion may include a second field specifying a destination, for example, an address, to which a captured packet is to be stored upon being captured at a given node. In some embodiments, the metadata header portion includes a destination of a capture service to perform the packet capture. This metadata header portion, in some embodiments, is a type-2 metadata header of the IETF Network Service Header.

In certain embodiments, the service chain implements a SFF capture policy that is instantiated or applied to certain service function forwarder associated with service functions that modifies portions of the packet content (e.g., packet payload), the packet header, or the encapsulated service function header. This policy streamlines the capture of a given packet received at the service function forwarder before and after the service function.

Reference is now made to FIG. 1 for a description of an example service chain in which a packet is selected and configured to signal its capture at one or more service functions within a service chain in accordance with an illustrative embodiment. A service chain, in some embodiments, is a policy construct embodied in a data structure comprised of an ordered list of service functions to be applied to packets that are forwarded along the service chain. The specific instances of traversed service functions form a service path 105 (shown as 105a, 105b, and 105c) such that individual service functions are selectively referenced by the service chain to be performed for certain packets. In some embodiments, each service path 105 is defined by an ordered list of service functions (e.g., service 1->service 2-> . . . ->service n) that is referenced by a service path identifier.

As shown in FIG. 1, a packet 102 (shown as "payload 102") is received at a classifier 104 from a network 106 at an ingress of a service chain 108 comprising the classifier 104, one or more service functions 110 (shown as service function 110a-110l), and service function forwarders 112 (shown as service function forwarder 112a-112l). The service chain 108 is established by a service controller 114 responsible for configuration of the classification policies associated with a given service chain. The controller 114, in some embodiments, provisions and instantiates each network element involved in the service path. In some embodiments, the controller 114 uses communication standards such as OpenFlow, Policy and Charging Rule Function (PCRF), network management protocol such as NETCONF, or direct device programming. In some embodiments, the controller 114 is a software defined-networking (SDN) controller. An example of a SDN controller is described in the OpenDaylight Project, such as Lithium, published by the Linux Foundation. The service controller 114 may interface with a network management station.

Service function forwarders (SFFs) provides service layer forwarding and is configured to receive service function traffic (e.g., service function packets) and to forward the traffic to a service function connected with the service function forwarder. A service function forwarder, in some embodiments, is connected to a plurality of service functions. In some embodiments, service function forwarders include routing or switching hardware implemented in a network device or a virtualized service of the same. A service function forwarder, in some embodiments, is configurations that include a transport definition (e.g., VLAN, VxLAN, MPLS) to connect to a service function, an IP definition (or a port if VxLAN), and a list of one or more service functions.

Service functions (SF) provides services for a specific treatment of the received packet. Service functions may be a virtual instance or embedded in a physical network device along with other service functions. Examples of service functions includes, but are not limited to network addressor translation (NAT) devices, intrusion prevention systems (IPS), intrusion detection systems (IDS), deep packet inspection (DPI) devices, firewalls, switches, network-attached storages (NAS), load balancers (LB), HOST_ID injection, TCP optimizer, wide-area network/local-area network (WAN/LAN) accelerators, and virtual machines (VM)). Service functions are combined to elastically define a service function chain.

FIG. 1 illustrates three service function paths 105a, 105b, 105c, each selectively referencing network services available to the service chain. As shown, service function path 105a includes network services $SF_0$ (110a), $SF_1$ (110b), $SF_2$ (110c) . . . , $SF_n$ (110d), which corresponds to "Service A" (e.g., network address translation), "Service B" (e.g., intrusion detection), "Service E" (e.g., firewall), and some network service referred to as "Service X". In a similar manner, service function path 105b includes network services $SF_0$ (110e), $SF_1$ (110f), $SF_2$ (110g) . . . , $SF_n$ (110h), which corresponds to "Service F" (e.g., application classifier), "Service D" (e.g., wide area application service (WAAS) accelerator), "Service E" (e.g., firewall), and "Service X"; and service function path 105c includes network services $SF_0$ (110i), $SF_1$ (110j), . . . , $SF_n$ (110k), which corresponds to "Service C" (e.g., load balancing), "Service D" (e.g., wide area application service (WAAS) accelerator), and "Service X".

Referring still of FIG. 1, the classifier 104 encapsulates the packet 102 with an encapsulating header 116 (also referred to as a "service function header 116") to form an encapsulated packet 118 (also referred to as a "service chain packet 118"). The classifier 104 selects the service function path 105, defined by a series of service function nodes 110, to which the service function packet is to be steered. In some embodiments, the service function path 105 is uniquely referenced and defined by a service path identifier parameter that associatively references a corresponding ordered list of network services. The classifier 104, in some embodiments, receives, from the service controller 114 a capture policy 120 for signaling the packet as a candidate for capture. In an embodiment, the capture policy 120 is based on a classification of a flow based on Layer 3/4 five-tuple parameters, Differentiated Services Code Point (DSCP), per service-function-path, as well as based on packet count or capture time window. The classifier 104 is configured to insert a capture flag signal 122 into the encapsulating header 116 for any received packet 102 that satisfies the capture policy.

The capture flag signal 122 signals a packet as a candidate for capture. The capture flag signal 122, in some embodiments, includes a single bit having preferably a value "1" to signal a packet as a candidate for capture and a value "0" as to signal a packet not as a candidate for capture. In some embodiments, the capture flag signal 122 includes a plurality of bits having, in some embodiments, metadata associated with the capture. The capture flag signal 122 allows subsequent receivers (e.g., service functions 110 or service function forwarders 112) of the service function packet 118 within a service chain 108 to determine whether to perform additional assessment of the received packet for capture or to not invoke any additional assessment of the packet for capture.

The capture flag signal 122 is inserted, in some embodiments, in the header 116, at a determined capture bit position of the header 116. In certain embodiments, the capture bit position is located at bit 4 of the base header of the network service header. In other embodiments, the capture bit position is located at bit 5 of the base header of the network service header. In other embodiments, the capture bit position is located at bit 6 of the base header of the network service header. In other embodiments, the capture bit position is located at bit 7 of the base header of the network service header. In other embodiments, the capture bit position is located at bit 8 of the base header of the network service header. In other embodiments, the capture bit position is located at bit 9 of the base header of the network service header. In other embodiments, the capture bit position is located at an available bit of the base header of the network service header. In other embodiments, the capture flag signal 122 is inserted into the network service header at a location that is not in the base header, for example, in a metadata portion of the header.

Referring still to FIG. 1, the network service header 116 includes a metadata header portion that includes information associated with the capture of the service function packet. The metadata header portion may include an address associated with a device to store the captured packet and/or a format data type.

Referring still to FIG. 1, the service function chain 108 includes an egress 128. In some embodiments, the edge SFF (e.g., 112d, 112h, and 112k) or egress 128 may be configured to reset the capture flag bit 122 in NSH header 116. This may be performed, for example, as a security measure.

Figure 2:
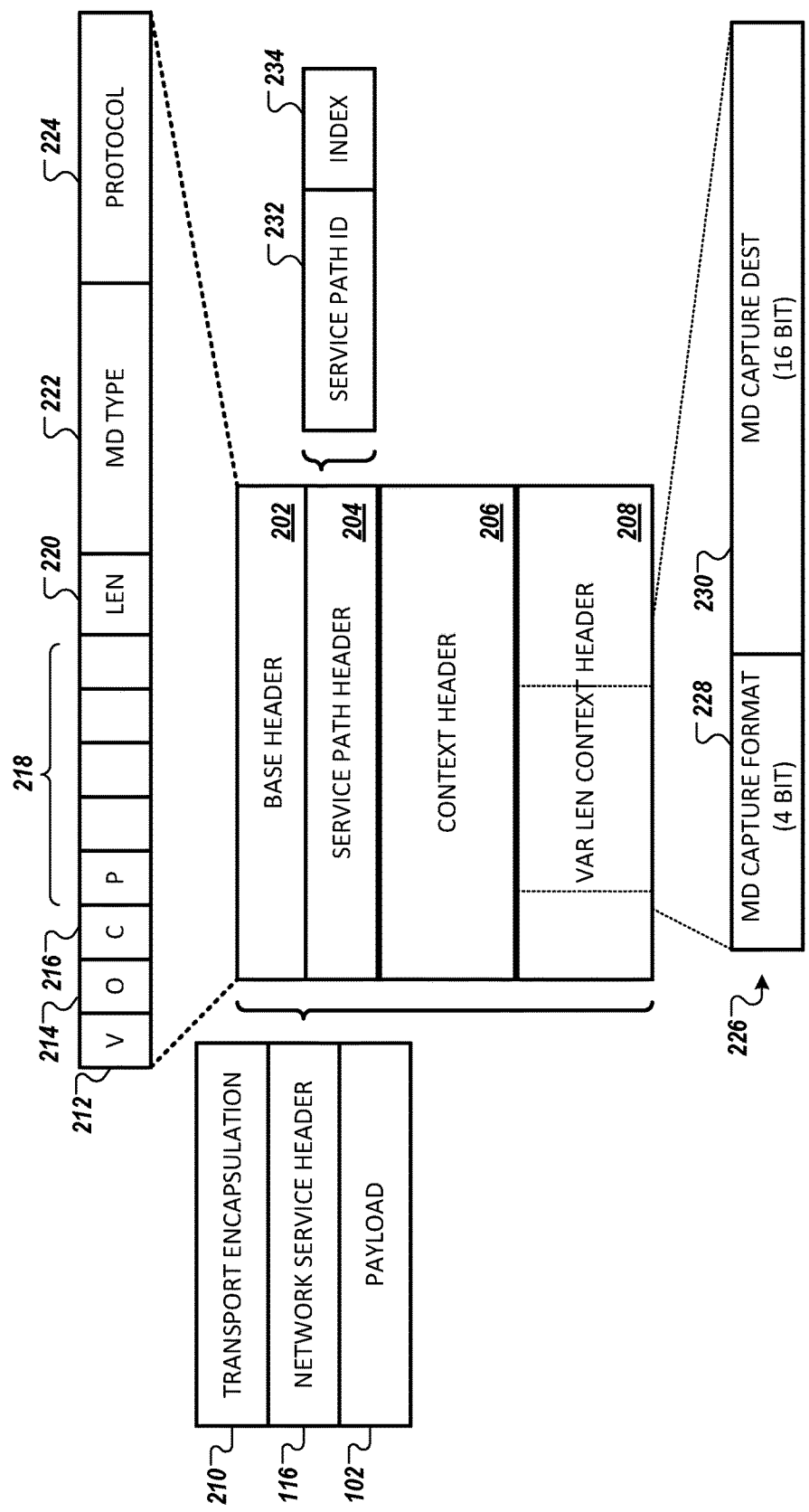
FIG. 2 is a diagram illustrating an example network service header of a service function packet that includes a capture flag signal, the capture flag signal enabling data-plane signaling of the packet as a candidate for capture within the service chain in accordance with an illustrative embodiment.

FIG. 2 is a diagram illustrating an example network service header 116 configured with a capture flag signal 122 to enable data-plane signaling of a packet for capture within the service function chain in accordance with an illustrative embodiment. The network service header 116 is imposed on an original packet 102 (also referred to as frames and shown as "payload 102") along with an outer network transport encapsulation identifier 210 that specifies the type of transport protocol (e.g., MPLS, VXLAN, GRE, VXLAN-GRE, or IP). As shown in FIG. 2, relevant portions of the network service header 116 includes a base header 202, a service path header 204, mandatory context headers 206, and optional variable length context header 208.

Description of the service path header 204, the mandatory context header 206, and optional variable length context header 208 are provided in the draft-ietf-sfc-nsh published by the Internet Engineering Task Force, the text of which is incorporated by reference herein in its entirety.

Referring still to FIG. 2, the base header 202 includes, in some embodiments, a first field 212 indicating a data plane version number, a second field 214 indicating configuration of the packet as an operation, administration and management (OAM) packet, a third field 216 indicating presence of a metadata parameter, a set of fourth fields 218 indicating flag bits for defining header changes and parsing behavior, a fifth field 220 indicating the length of the network service header, a sixth field 222 indicating a metadata type, and a seventh field 224 indicating a protocol type (e.g., IPv4, IPv6, Ethernet) of the original encapsulated packet 102. In some embodiments, the fields 212, 214, 216, 218, 220, 222, and 224 are, collectively, 4-bytes (32 bits) in length, with the fields having 2 bits, 1 bit, 1 bit, 6 bits, 6 bits, 8 bits, and 8 bits in respective lengths. In certain embodiments, the capture flag signal 122 is located in one of the set of fourth fields 218.

In some embodiments, the service path header 204 includes a service path identifier field 232 and a service index field 234. The service path identifier 232, in some embodiments, is a 24-bit field that references a selected service function path (e.g., path 0 to path pb $2^{24}$-1) that provides a specific ordered set of network services (e.g., service 1->service 2->service 3 . . . etc). The service index field 234, in some embodiments, is an 8-bit field that identifies a location to which the packet is located along a service function path (e.g., position 0 to position $2^8$-1). In some embodiments, the service index field 234 is decremented following completion of a service along a given service function path. The service index field 234 and service path identifier field 232 may be used to reference a table that identifies an ordered list of network services.

In some embodiments, the optional variable length context header 208 includes metadata 226 to provide policy or instructions for the capturing of the packet. In some embodiments, the metadata includes a first field 228 indicating a capture format definition (e.g., file format type) of the packet and a second field 230 indicating a capture destination identifier. The destination identifier, in some embodiments, is a hash of a destination address, a reference number for a lookup table to a destination address, or an IP address, etc. The capture format definition field 228, in some embodiments, is 4 bits in length, and the capture destination field 230 is 16 bits in length.

FIGS. 3A and 3B each illustrates an example service function table defining a service function path in accordance with an illustrative embodiment. As shown in each of FIG. 3A and FIG. 3B, a service function table 300 associated with a service function path 105 includes the service path identifier 232 (shown as 232a and 232b), and a plurality of service function nodes 302 (shown as service function node 302a, 302b, and 302c), where each service function node 302 corresponds to a given service function. As shown, each service function node 302 is defined by the service index 234 (shown as 234a and 234b), a service function identifier 306 (shown as 306a and 306b), and a next service function forwarder 308 (shown as 308a and 308b).

Figure 4:
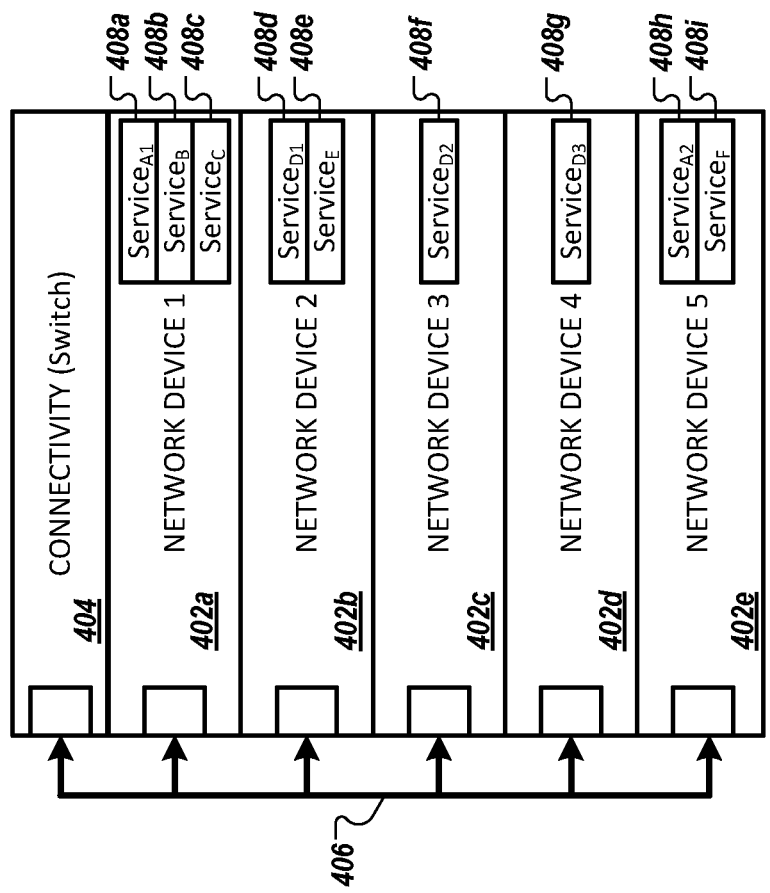
FIG. 4 is a diagram illustrating a set of network service systems in a service chain network in accordance with an illustrative embodiment.

FIG. 4 is a diagram illustrating a set of network service systems in a service function chain network in accordance with an illustrative embodiment. Each network system 402 (shown as 402a, 402b, 402c, 402d, and 402e) are operatively connected, via one or more connections 406, to one another and one or more connectivity devices 404 (such as a router or a switch). Multiple connections 406 may be used, for example, to provide redundant and/or shared operations.

As shown in FIG. 4, a given network system 402 may include one or more service functions 408 (shown as 408a-408i). Each service function 408 is assignable for scheduled consumption based on selective steering of traffic, by the connectivity device 404 (as a service function forwarder), according to a policy construct defined by the service chain. As shown, network device 1 (402a) includes network service "A1" (408a), network service "B" (408b), and network service "C" (408c), which may correspond to, for example, a network address translation service, intrusion detection service, and a load balancer service. Multiple service functions 408 may reside on a given network system 402. The network systems 402, in some embodiments, are mounted together in rack-mount configurations.

Within the set of network service systems, multiple services of the same type may be duplicated to provide additional service function of that type. Service functions may use specialized hardware (such as ASICs), content addressable memory (CAMs and TCAMs), and circuitry to provide optimized service functions as well as virtualized services performed on virtual machines.

Capture Policy

As discussed, the capture policy 120 to classify a packet as a candidate for packet capture may be based on one or more classifications of a flow.

Figure 5:
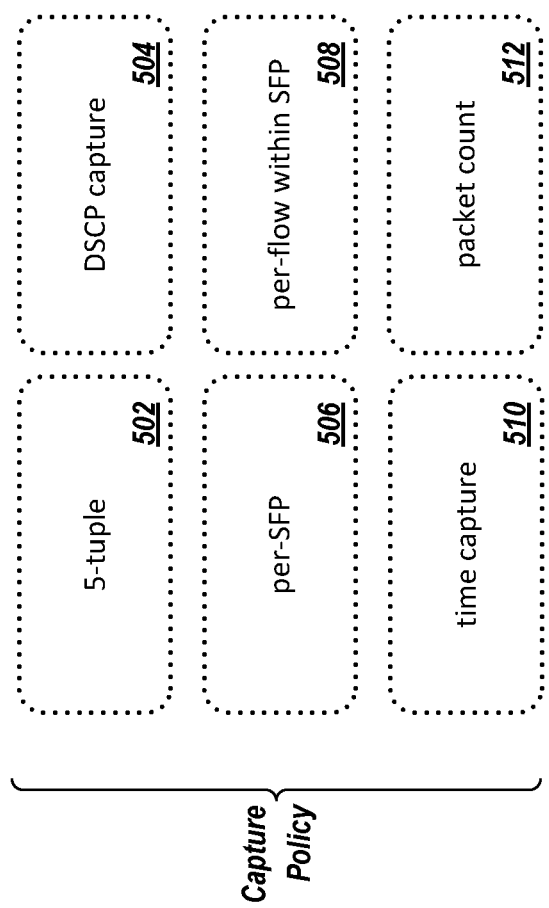
FIG. 5 depicts diagram of capture policies for a service header packet in accordance with an illustrative embodiment.

FIG. 5 depicts a diagram of a capture policies for a service header packet in accordance with an illustrative embodiment. These examples of capture policies are merely illustrative and are not provided as a limiting examples.

As shown, a first capture policy 502, in some embodiments, is based on Layer 3/4 five-tuple parameters. A classifier, running this policy 502, may signal one or more service function packets, as a candidate for packet capture, if the packet includes a set of one or more parameters matching a specified five-tuple classification, or a specified portion thereof—for example, a matched IP source address parameter, a matched UDP/TCP source port parameter, a matched IP destination address parameter, a matched UDP/TCP destination port parameter, and a matched protocol identifier parameter.

In addition, a second capture policy 504, in some embodiments, is based on Differentiated Services Code Point (DSCP) classification of the packet. A classifier, running this policy 504, may signal one or more service function packets, as a candidate for packet capture, that include a specified DSCP classification parameter.

In addition, a third capture policy 506, in some embodiments, is based on a per service function path ("per-SFP") basis 506. A classifier, running this policy 506, may signal one or more service function packets within a given service function path as a candidate for capture. The service function may be referenced by a service path identifier value associated with a specified set of network services.

In addition, a fourth capture policy 508, in some embodiments, is based on a per-flow basis for a given service function path. A classifier, running this policy 508, may signal one or more service function packets within a given service function path as a candidate for capture based on a flow or application type (e.g., video, audio, data, VOIP). The classification, in some embodiments, further includes a service path identifier value that limits the classification to certain application or flow type along a given service function path.

A fifth capture policy 510 is based on a specified time window parameter. A classifier, running this policy 510, may select one or more packets that are specified within a time window. In some embodiments, the time window may be specified by a period of time following a specified triggered event.

A sixth capture policy 512 is based on packet counts. A classifier, running this policy 512, may select a specified number of service function packets for capture. The capture may be invoke following a triggered event.

Figure 6:
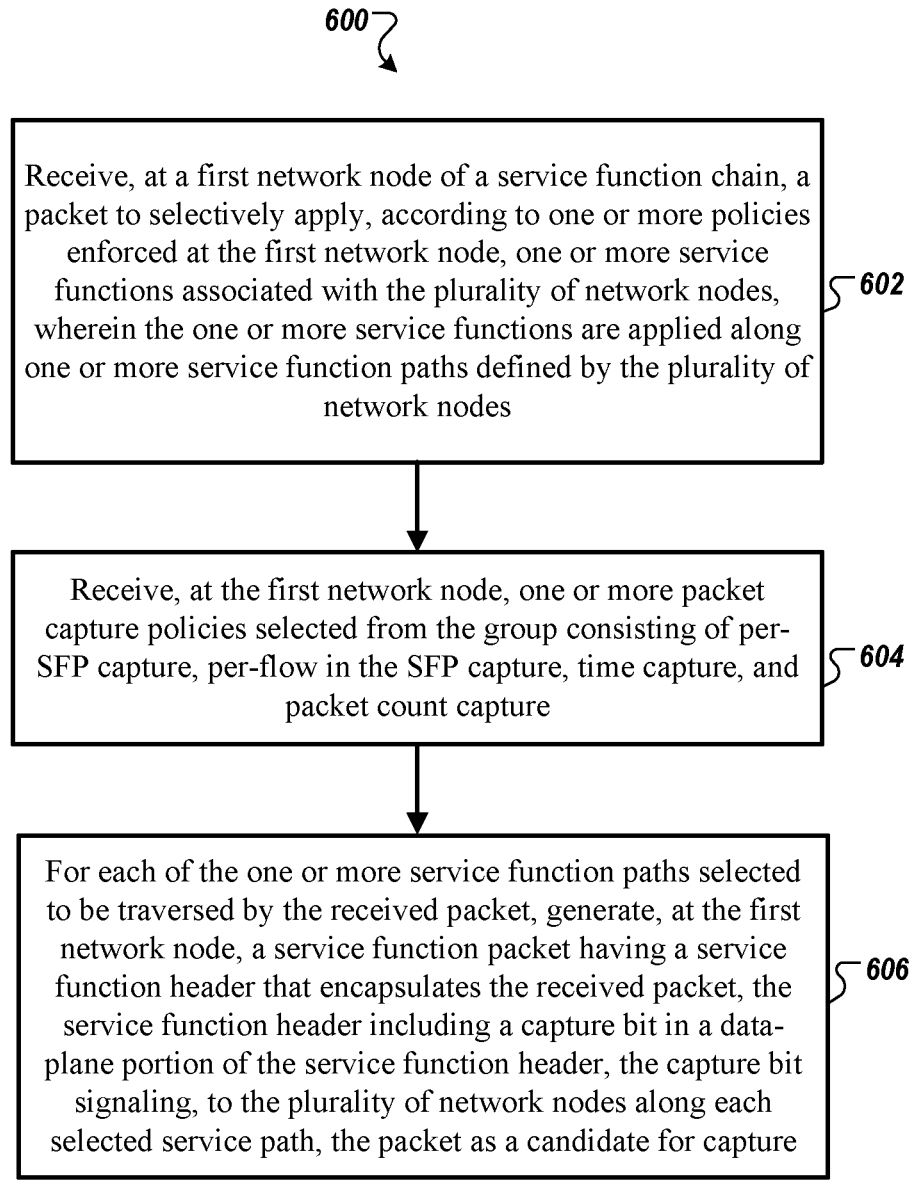
FIG. 6 depicts a flow diagram of a method of operation, for an ingress node of a network, for data plane signaling a packet as a candidate for capture in a service function chain network in accordance with an illustrative embodiment.

FIG. 6 depicts a flow diagram of a method 600 of operation, for an ingress node of a network, for data plane signaling of a packet as a candidate for capture in a service function chain network in accordance with an illustrative embodiment. The method 600 is described in relation to FIG. 1.

The method 600 includes receiving, at step 602, at a first network node 104, a packet 102 to selectively apply, according to one or more policies enforced at the first network node 104, one or more service functions 110 of a plurality of service functions associated with the plurality of network nodes, wherein the one or more service functions 110 are applied along one or more service function paths 105 defined by the plurality of network nodes.

The method 600 further includes receiving, at step 604, at the first network node 104, one or more packet capture policies 120 selected from the group consisting of per-SFP capture, per-flow in the SFP capture, time capture, and packet count capture. In some embodiments. The capture policies 120 is received from the controller 114, for example, a Software Defined Network Controller (SDN controller). The controller 114, in some embodiments, is connected to an end user device.

The method 600 further includes, at step 606, for each of the one or more service function paths 105 selected to be traversed by the received packet 102, generating, at the first network node 104, a service function packet 118 having a service function header 116 that encapsulates the received packet 102, the service function header 116 including a capture bit 122 in a data-plane portion of the service function header 116, the capture bit 122 signaling, to the plurality of network nodes (SFFs 110 or SFs 112) along each selected service path 105, the packet 118 as a candidate for capture.

As, for example, shown in FIG. 1, each generated service function packet 118 is transmitted to a plurality of service function forwarders 112 associated with the selected service function path 105 where each service function forwarder 112 is traversed according to an order defining the selected service function path 105. As each service function forwarder (SFF) 112, the SFF 112 forwards a given received packet to a corresponding service function (SF) 110 associated with the SFF and then forwards the received network service packet 118 to a next SFF 112. For example, as shown in FIG. 1, service function forwarder $SFF_0$ (112e) receives a packet 118 and forwards the packet 118 to service function $SF_0$ (110e). Following the service function $SF_0$ (110e) returning either the packet 118 to $SFF_0$ (112e) or an acknowledgement of the packet 118 being ready to forward to the next service function forwarder, $SFF_0$ (112e) directs the packet 118 to the next service function forwarder $SFF_1$ (112f) to which the service function $SF_1$ (110f) is applied. The service function forwarder 112e may use the service path identifier 232 to determine, via a lookup table, the service function 110e as discussed in relation to FIGS. 3A and 3B.

Figure 7:
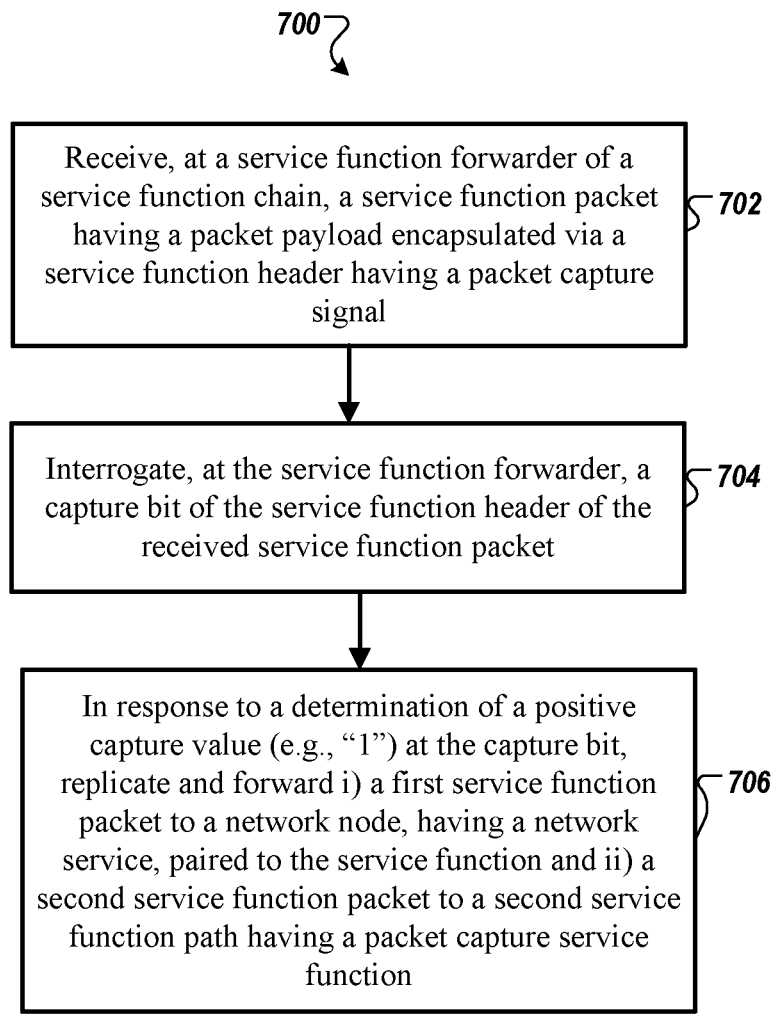
FIG. 7 depicts a flow diagram of a method of operation, for a service function forwarder, upon receiving a packet signaled as a candidate for capture in a service function chain network in accordance with an illustrative embodiment.

FIG. 7 depicts a flow diagram of a method 700 of operation, for a service function forwarder, upon receiving a packet signaled as a candidate for capture in a service function chain network in accordance with an illustrative embodiment. The method 700, at step 702, includes receiving, at a service function forwarder, a service function packet, the service function packet having a packet payload encapsulated via a service function header. The method 700, at step 704, includes interrogating, at the service function forwarder, a capture bit of the service function header of the received service function packet. The method 700, at step 706, includes, in response to a determination of a positive capture value at the capture bit, replicating and forwarding i) a first service function packet to a network node, having a network service, paired to the service function forwarder prior to forwarding the first service function packet to a next service function forwarder along the first service function path and ii) a second service function packet to a second service function path having a packet capture service function and/or a packet analysis service function. In some embodiments, the packet capture service function includes a packet storage service, and the packet analysis service includes a deep packet inspection service.

As shown, for example, in FIG. 1, following receipt of the packet 118 at the service function forwarder $SFF_0$ (112e), the service function forwarder $SFF_0$ (112e) interrogates the capture bit 122 and initiate, upon a presence of a positive capture signal (e.g., a "1"), capture of the encapsulated packet 102 of the service function packet. In some embodiment, the service function forwarder $SFF_0$ captures the packet 102 by replicating and directing the service function packet 118 on a second service function path 126 having a packet capture service function and/or a deep packet inspection service function. In some embodiments, the capture bit 122 (e.g., bit 4, 5, 6, 7, 8, or 9) is defined in a base header 202 of a Network Service Header (NSH) 116. As shown in service function path 105b of FIG. 1, upon each positive-signaled packet 118 (e.g., have a positive signal at capture bit 122) being received at $SFF_0$ (112e), $SFF_1$ (112f), $SFF_2$ (112g) to $SFF_n$ (122h), the packet 118 is directed to i) a next SFF along the service function path 105b as well as to ii) a $SFF_0$ (112l) having a capture service function $SF_0$ (110l) of a second service function path 105(d).

As further shown in FIG. 1 in relation to service function path 105a, upon each negative-signaled packet 118 (e.g., having a negative signal, e.g., "0", at capture bit 122), being received at $SFF_0$ (112a), $SFF_1$ (112b), $SFF_2$ (112c) to $SFF_n$ (122d), the packet 118 is merely directed to a next SFF along the service function path 105a.

Granular Capture Control Via SFF Policies

The various SFF policies provides granular controls of the capturing of packets within the service chain. These policies may be defined and instructed through the service controller 114 to be enforced at each respective service function forwarder 112. FIGS. 8-14 depict diagrams of service-function forwarder policies that provides granular controls of interrogation of the data plane signaling in the service function header.

Figure 8:
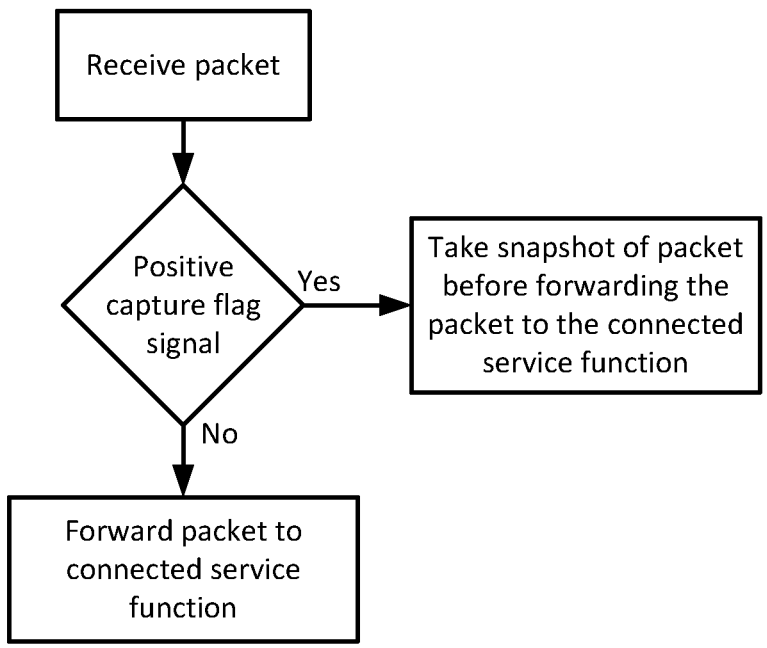
FIGS. 8-11, comprising

FIG. 8 illustrates a first SFF capture policy in accordance with an illustrative embodiment. As shown in FIG. 8, upon receipt of a network service packet signaled as a candidate for capture, the service function forwarder is configured to create a snapshot, or initiate a capture process, of the packet prior to the packet being forwarded to the connected service function associated with the forwarder.

Figure 9:
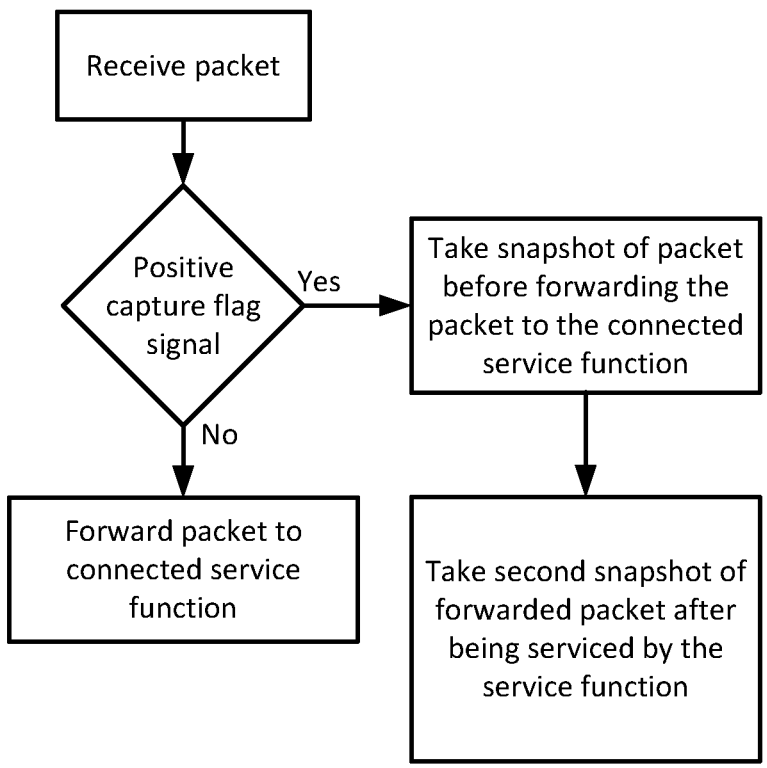

FIG. 9 illustrates a second SFF capture policy in accordance with another illustrative embodiment. As shown in FIG. 9, the service function forwarder is configured to create a second snapshot of the packet after the packet has been forwarded to the connected service function. In some embodiments, the second snapshot is contemporaneous with (e.g., triggered by) the return of the forwarded service function packet from the connected service function. In other embodiments, the second snapshot is contemporaneous with the forwarding of the service function packet to the next service function forwarder. To this end, a single signaling of the packet for capture results in two instances of capture of the packet—the first instance being contemporaneous with the service function forwarder forwarding the service function packet to the service function, and the second instance being contemporaneous with (or triggered by) either the service function packet returning from the service function (or service function proxy) or the service function forwarder forwarding the service function packet to the next service function forwarder.

This SFF policy maybe instantiated or applied to certain service function forwarder associated with service functions that modifies portions of the packet content (e.g., packet payload), the packet header, or the encapsulated service function header. This policy streamlines the capture of a given packet received at the service function forwarder before and after the service function. For illustrative purposes and not to be a limiting example, a network address translation service may modify the network address in the header of the packet to which the modification is useful to track. This SFF policy would streamline the capture of the packet before and after the translation. In a similar manner, programmable data-plane components may arbitrarily modify packets, for example, to reclassify DSCP.

Figure 10:
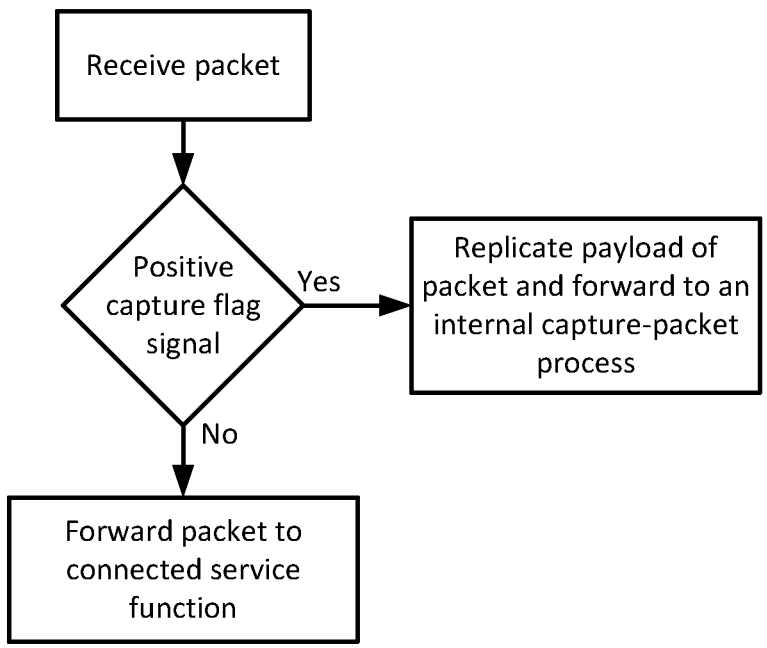

FIG. 10 illustrates a third SFF capture policy in accordance with another illustrative embodiment. To perform a capture, the service function forwarder, in some embodiments, is configured to replicate the payload of the network service packet to an internal capture-packet process.

Figure 11:
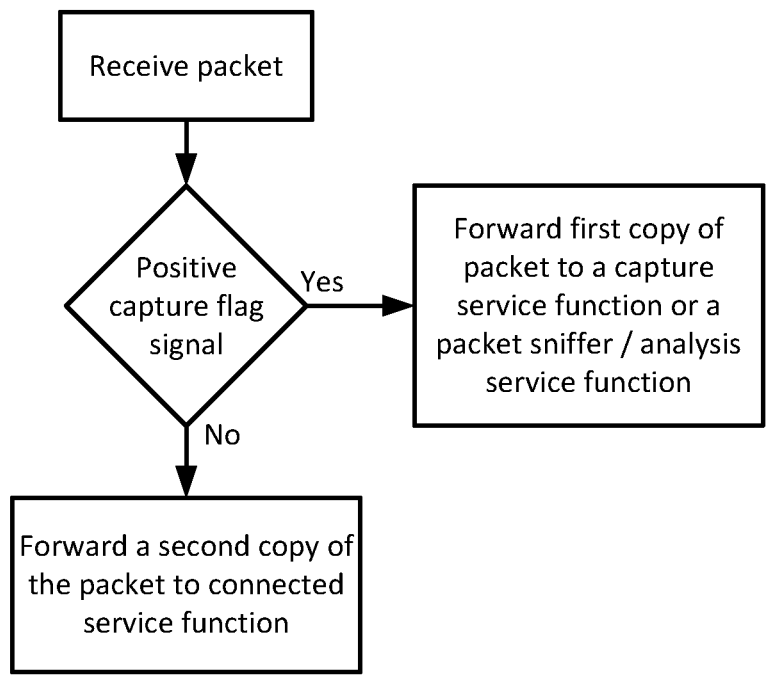

FIG. 11 illustrates a fourth SFF capture policy in accordance with another illustrative embodiment. The service function forwarder is configured to forward a first copy of the network service packet to a capture service function and forward a second copy of the network service packet to the connected service function. The capture service function is configured to store the received packet in local memory or coordinate storage of the packet at a storage area network (SAN). In other embodiments, the first copy of the network service packet is forwarded to a packet sniffer/analyzer service function and forward a second copy of the network service packet to the connected service function. The network service packet may be analyzed at the packet sniffer/analyzer service function prior to the packet being captured. In some embodiments, the service function forwarder is configured to interrogate the metadata header portion of the Network Service Header to determine an address for the packet sniffer/analyzer service function. In some embodiments, the service function forwarder is configured to interrogate the metadata header portion of the Network Service Header to determine a file type for the capture at the packet sniffer/analyzer service function. In some embodiments, the packet sniffer/analyzer service function includes Wireshark packet analyzer. In some embodiments, the metadata header portion includes a type-2 metadata header of the Network Service Header (NSH).

SFF Policies

Service function forwarder may be instructed by the controller on an individual or a group basis of a policy for the capture flag bit. FIGS. 12-14, comprising FIGS. 12, 13, and 14, are diagrams illustrating SFF policies in a service chain network in accordance with an illustrative embodiment.

FIG. 12 illustrates a first SFF policy in accordance with another illustrative embodiment. As shown in FIG. 12, the service function forwarder is not instructed to interrogate the network service header at the capture flag bit upon receipt of a network service packet, thereby ignoring the capture signaling. This policy may be applicable for certain service function in which packet capture is not of interest or in service chain instances in which packet capture is not of interest.

FIG. 13 illustrates a second SFF capture policy in accordance with another illustrative embodiment. As shown in FIG. 13, the service function forwarder is instructed to interrogate a given received network service header at the capture flag bit, and in response to a positive signal therein (e.g., a "1"), the service function forwarder is configured to capture the packet.

FIG. 14 illustrates a third SFF capture policy in accordance with another illustrative embodiment. As shown in FIG. 14, the service function forwarder is instructed to only interrogate, or not interrogate, the network service header at the capture flag bit upon receipt of a network service packet for certain selective service function paths (SFPs).

Figure 15:
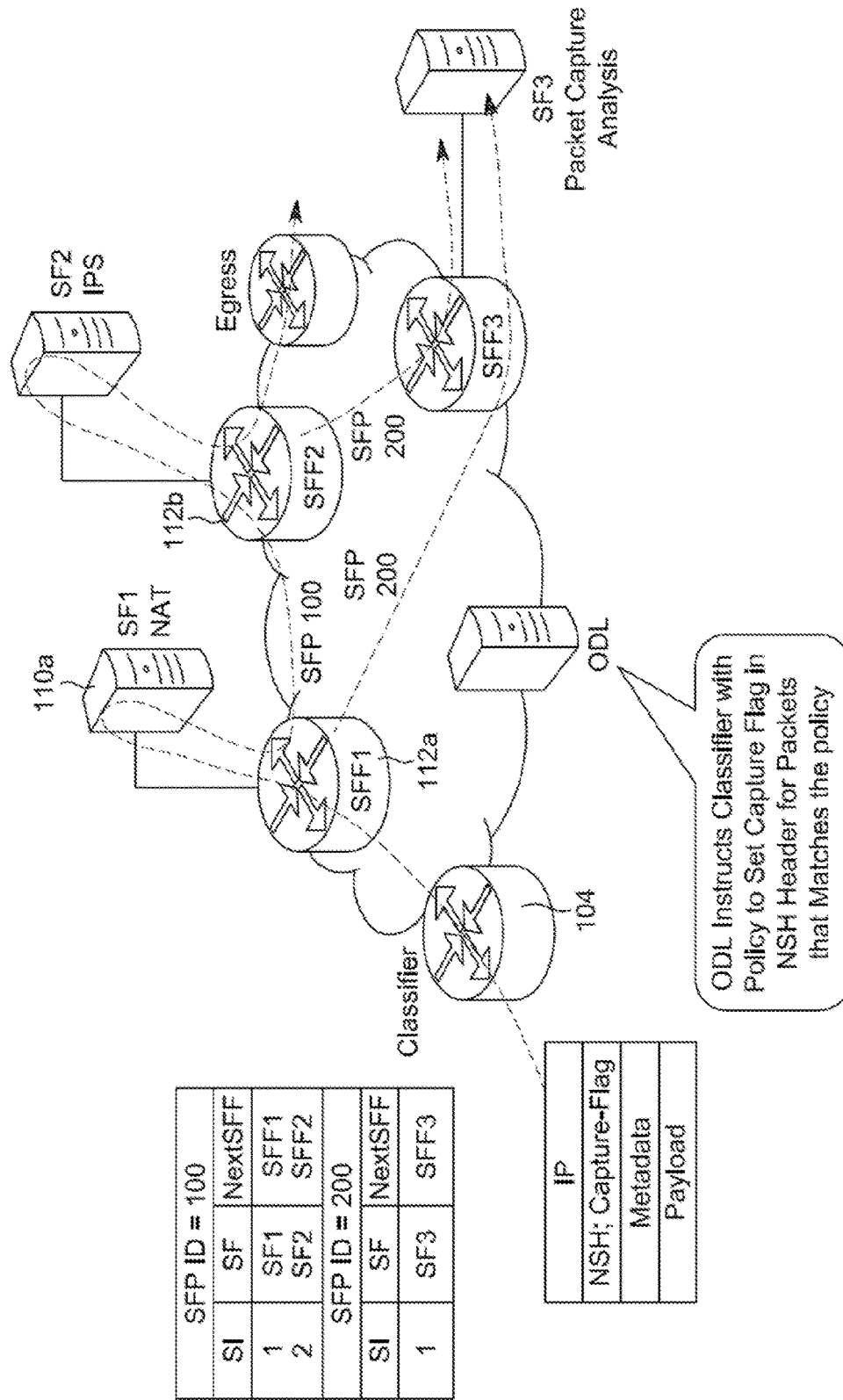
FIG. 15 depicts a diagram of operations of a service function chain that uses a capture flag bit in the data plane to signal a packet as a candidate for capture.

FIG. 15 depicts a diagram of operations of a service function chain that uses a capture flag bit in the data plane to signal a packet as a candidate for capture. A classifier 104 is instructed with a policy to mark a capture flag in the Network Service Header (NSH) base header for any packet that satisfies the policy. As this is done in the NSH, the signaling happens in band within the same traffic flow. This flag can be seen and processed by all network and service elements within the flow path.

Any service function forwarder (SFF) (e.g., 112a), upon receiving the packet 118 with a flag set, takes a first snapshot of the packet 118 before forwarding the packet 118 to a service function (SF) 110a and a second snapshot after receiving the packet back from the SF 110a (before forwarding the packet to the next SFF 110b).

As shown in FIG. 15, OpenDaylight controller 114 instructs the classifier 104 with a relevant policy 120 (5-tuple, DSCP, per-SFP, etc.) to set the Capture-Flag 122 in the NSH base header 116 for all packets 102 that matches the policy 120. By signaling at the classifier 104, an operator seeking to analyze or troubleshoot a service function network may control the granularity of the packet capture in terms of per-SFP, per-flow within SFP, time based capture and packet count based captures. To this end, the transit SFF does not need a complex trigger to be programmed nor does it need to perform a Deep Packet Inspection (DPI) into the payload to selectively capture the packet. The classification is perform once by the classifier 104, which sets the capture flag for all relevant packets. Service function forwarders (SFFs) 112 only have to look for the SFP-ID and the flag to assess whether a packet 118 is a potential candidate for a packet sniffer or analyzer.

The forwarding semantic on each SFF (112) configured such that when the packet is received from a previous SFF (e.g., 112a) or from a connected SF (e.g., 110a), the SFF 112 replicates the packet to an internal packet capture-process and then forward the packet based on the SFC table. That is, a first service function path 105b is maintained for a given service function packet, and a second service function path 105d is created for the capture and/or analysis of the packet, once it has been signaled as a candidate for capture. Because there is no header/payload rewrite required, this activity can be done at fast path.

In some embodiments, depending on the agreement between different domain operators, the service function chain network may be extended, for example, for Inter-AS SFC scenarios. The capture flag bit in NSH header may be carried over in a corresponding header.

What is claimed is:

1. A method comprising:
   in a service function chain network, receiving, at a first network node, a packet to selectively apply, according to one or more policies enforced at the first network node, one or more service functions of a plurality of service functions associated with a plurality of network nodes, wherein the plurality of network nodes comprise one or more devices selected from the group consisting of a router, a network addressor translation (NAT) device, an intrusion prevention system (IPS), an intrusion detection system (IDS), a deep packet inspection (DPI) device, a firewall, a switch, a network-attached storage (NAS) device, a load balancer (LB) system, a wide-area network/local-area network (WAN/LAN) accelerator, a computing device executing a virtual instance of any of the above, and a computing system executing a virtual machine (VM);

receiving, at the first network node, one or more packet capture policies; and for each of the one or more service function paths selected to be traversed by the received packet, generating, at the first network node, a service function packet having a service function header that encapsulates the received packet, wherein the service function header includes a capture bit in a data-plane portion of the service function header, and wherein the capture bit signals, to the plurality of network nodes along each selected service path, the packet as a candidate for capture.

2. The method of claim 1, wherein each generated service function packet is transmitted to a plurality of service function forwarders associated with the selected service function path, each service function forwarder being traversed according to an order defining the selected service function path and having forwarded the received network service packet to a corresponding network node associated with the given service function forwarder to apply a service function prior to forwarding the received network service packet to a next service function forwarder, and wherein each service function forwarder is configured to interrogate the capture bit and initiate, upon a presence of a positive capture signal, and capture the encapsulated packet of the service function packet.

3. The method of claim 1, wherein each generated service function packet is transmitted to a plurality of service function forwarders associated with the selected service function path, each service function forwarder being traversed according to an order defining the selected service function path and having forwarded the received network service packet to a corresponding network node associated with the given service function forwarder to apply a service function prior to forwarding the received network service packet to a next service function forwarder, and wherein each service function forwarder is configured to interrogate the capture bit and initiate, upon a presence of a positive capture signal, and capture the service function packet.

4. The method of claim 3, wherein, upon a detected presence of a positive capture signal at the capture bit, the service function forwarder being configured to replicate a second service function packet and classifying the replicated second service function packet to a first service function path having a packet capture service function or a second service function path having a deep packet inspection service function.

5. The method of claim 3, wherein, upon a detected presence of a positive capture signal at the capture bit, the service function forwarder being configured to:

forward the received network service packet to the corresponding network node associated with the given service function forwarder to apply a service function;

replicate a first capture service function packet corresponding to the received network service packet and forward the first capture service function packet to a service function path having a packet capture service function and/or packet analysis service function; and upon receipt of the received network service packet returning from the corresponding network node, replicate a second capture service function packet corresponding to the returned network service packet and forward the second capture service function packet to the service function path having the packet capture service function and/or packet analysis service function.

6. The method of claim 1, wherein the service function header includes a base header of a Network Service Header (NSH).

7. The method of claim 3, wherein the capture bit comprises at least one bit selected from the group consisting of bit 4, bit 5, bit 6, bit 7, bit 8, and bit 9, of the base header of the Network Service Header.

8. The method of claim 1, wherein the one or more capture policies are selected from the group consisting of per-SFP capture, per-flow in the SFP capture, time capture, and packet count capture.

9. The method of claim 1, wherein the first network node includes a classifier located at an ingress node of the network.

10. The method of claim 1, wherein the service function packet generated at the first network node includes a metadata header portion, the metadata header portion comprising a first field specifying a capture format definition and a second field for specifying a capture destination address.

11. The method of claim 1, wherein the metadata header portion comprises a type-2 metadata header of the Network Service Header.

12. The method of claim 1, wherein each of the network nodes of the first and second sets of network nodes is configured to interrogate the capture definition data in response to a positive capture indication at the capture position of the interrogated encapsulated header, said network node i) forwarding the received encapsulating header and corresponding encapsulated packet to a next service function forwarder along the service function path and ii) forwarding the encapsulated packet to a network storage specified at the capture destination address.

13. The method of claim 1, wherein, at a second network node located, along a service path, downstream to the first network node, modifying the capture bit of the service function header to signal the service function packet as a candidate for capture by one or more third network nodes along the service path.

14. The method of claim 11, wherein the second network node includes a service function forwarder (SFF) or a service function (SF).

15. A method comprising:

in a service function chain network, receiving, at a service function forwarder of a plurality of service function forwarders, collectively, forming a first service function path, a service function packet, the service function packet having a packet payload encapsulated via a service function header;

interrogating, at the service function forwarder, a capture bit in a data-plane portion of the service function header of the received service function packet, wherein the capture bit signals the received service function packet as a candidate for capture, wherein the received service function packet was generated by a first network node in the service function chain network from a packet received there-at that selectively applied, according to one or more policies enforced at the first network node, one or more service functions of a plurality of service functions associated with the plurality of network nodes, and wherein the plurality of network nodes comprise one or more devices selected from the group consisting of a router, a network addressor translation (NAT) device, an intrusion prevention system (IPS), an intrusion detection system (IDS), a deep packet inspection (DPI) device, a firewall, a switch, a network-attached storage (NAS) device, a load balancer (LB) system, a wide-area network/local-area network (WAN/LAN) accelerator, a computing device executing a virtual instance of any of the above, and a computing system executing a virtual machine (VM); and in response to a determination of a positive capture value at the capture bit, replicating and forwarding i) a first service function packet to a network node, having a network service, paired to the service function forwarder prior to forwarding the first service function packet to a next service function forwarder along the first service function path and ii) a second service function packet to a second service function path having a packet capture and/or analysis service function.

16. The method of claim 15, comprising:

in response to a determination of a positive capture value at the capture bit, replicating and forwarding the first service function packet to the network node, having the network service, paired to the service function forwarder prior to forwarding the first service function packet to the next service function forwarder along the first service function path.

17. The method of claim 15, wherein the packet capture service function of the second service function path aggregates all service header packets designated as a candidate for capture within the service function chain network.

18. The method of claim 15, comprising:

upon receipt of the first service function packet returning from the network node paired to the service function forwarder, replicating and forwarding the returned first service function packet to the second service function path having the packet capture and/or analysis service function.

19. A system comprising:

a plurality of network devices;

a service function controller, comprising:

a network interface;

a processor coupled to the network interface; and a memory having instructions stored thereon, wherein the instructions, when executed by the processor, cause the processor to:

receive, via the network interface, a packet to selectively apply one or more service functions of the plurality of service functions associated with the plurality of network devices, wherein the one or more service functions are applied along one or more service function paths defined by the plurality of network devices, wherein the plurality of network nodes comprise one or more devices selected from the group consisting of a router, a network addressor translation (NAT) device, an intrusion prevention system (IPS), an intrusion detection system (IDS), a deep packet inspection (DPI) device, a firewall, a switch, a network-attached storage (NAS) device, a load balancer (LB) system, a wide-area network/local-area network (WAN/LAN) accelerator, a computing device executing a virtual instance of any of the above, and a computing system executing a virtual machine (VM);

receive, via the network interface, one or more packet capture policies; and for each of the one or more service function paths selected to be traversed by the received packet, generate a service function packet having a service function header that encapsulates the received packet, wherein the service function header includes a capture bit in a data-plane portion of the service function header, and wherein the capture bit signals, to the plurality of network nodes along each selected service path, the packet as a candidate for capture.

* * * * *